United States Patent
Kasai

[11] 3,927,947
[45] Dec. 23, 1975

[54] POLARIZATION ANALYSER DEVICE
[75] Inventor: Toshiyuki Kasai, Kawasaki, Japan
[73] Assignee: Nippon Kogaku K.K., Tokyo, Japan
[22] Filed: Nov. 7, 1974
[21] Appl. No.: 521,923

[30] Foreign Application Priority Data
Nov. 12, 1973 Japan.............................. 48-126183

[52] U.S. Cl.............................. 356/117; 356/118
[51] Int. Cl.²...................................... G01N 21/40
[58] Field of Search............................ 356/117, 118

[56] References Cited
UNITED STATES PATENTS
3,741,661  6/1973  Yamamoto et al. ................ 356/117

Primary Examiner—Robert Segal
Attorney, Agent, or Firm—Fitzpatrick, Cella, Harper & Scinto

[57] ABSTRACT

Polarization analyser device comprises a light source, a condenser lens for forming the light from said source into a parallel light beam, a monochrome filter for forming the light from said lens into a predetermined wavelength of light, a polarizer disposed with azimuth at 0°, a half mirror disposed between said polarizer and said filter, a condenser lens and a light receiving element both disposed in the light reflecting direction of the half mirror, two light modulators disposed in the light transmitting direction of said half mirror with azimuth at 45°, two ¼ wavelength plate disposed with azimuth at 0° and 45°, respectively, a ½ wavelength plate disposed rotatably about the optical axis and a reflecting mirror disposed perpendicularly to the optical axis.

The device further comprises a synchronous rectifying circuit for dividing the light modulated by said two modulator into the signal of phase difference of and the signal of azimuth of a sample. A servo motor of which input is signal of the phase difference of outputs from the synchronous rectifying circuit, is associated with said ½ wavelength plate. A display circuit is provided for displaying an amount of rotation of the servo motor. A further display circuit is provided for displaying the phase difference of the sample.

7 Claims, 11 Drawing Figures

POLARIZATION ANALYSER DEVICE

BACKGROUND OF THE INVENTION

1. Field of the Invention

This invention relates to a polarization analyser device.

2. Description of the Prior Art

Conventional polarization analyser devices have been large-sized because their illuminating optical system and light receiving optical system are separate from each other, and this is compatible with the use in laboratories but not suitable for the use in measurement during manufacturing processes.

Polarization analyser devices have often been used for the thickness measurement and analysis usually of skin or film on metal surface. This is done by knowing two polarization variables, i.e. phase difference $\Delta$ and azimuth angle $\phi$, of a substance.

However, during the manufacture of steel sheets or the like, if the thickness of the steel sheet or the thickness of skin or film heat-secured to a large body is to be measured and analysed over a wide range, it is impossible to move the body itself for the measurement and the analyser device must be moved. Nevertheless, it is very difficult to move such device as a whole even if it is small in size.

SUMMARY OF THE INVENTION

It is a first object of the present invention to provide a compact polarization analyser device by making it reciprocally movable and making an illuminating optical system and a light receiving optical system common with each other.

It is a second object of the present invention to provide a compact, reciprocally movable polarization analyser device of which only a portion (measuring portion) is made movable to enable the aforesaid wide-range measurement.

The invention will become more fully apparent from the following detailed description thereof taken in conjunction with the accompanying drawings.

DESCRIPTION OF THE PREFERRED EMBODIMENTS

A first embodiment of the present invention will hereinafter be described with reference to FIG. 1 and FIGS. 3a to 3g.

Figures 1, 2:
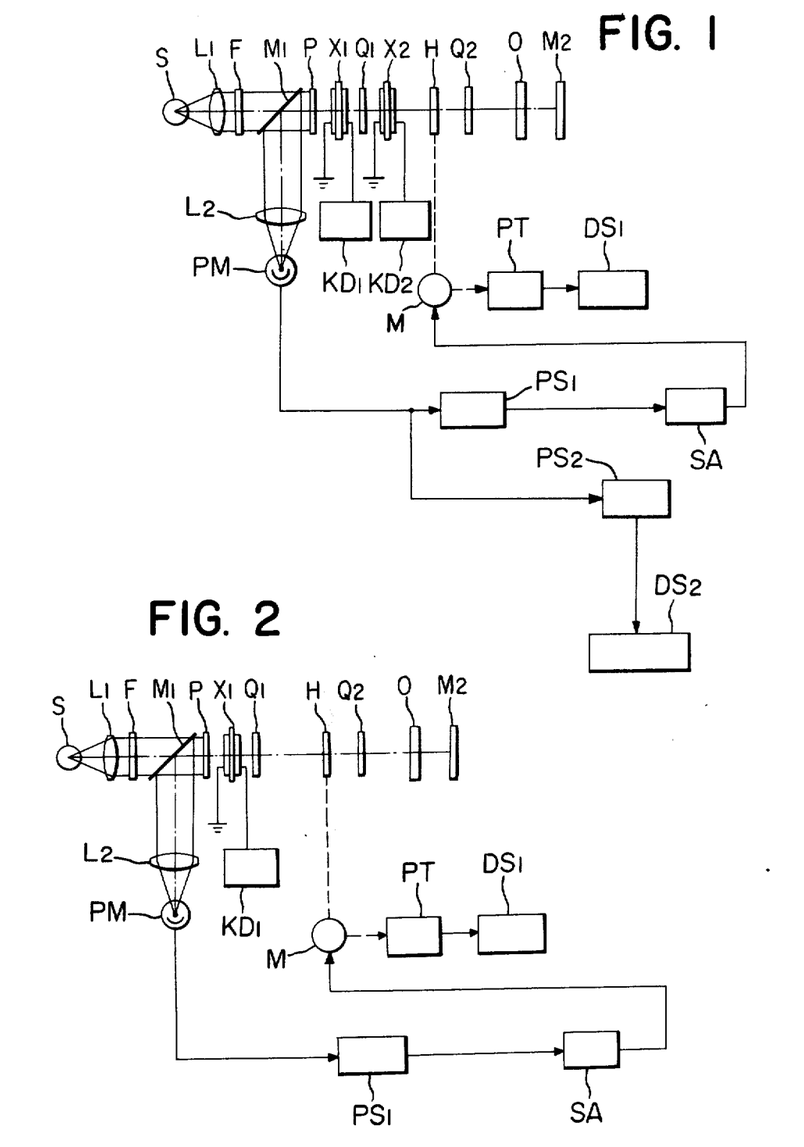
FIG. 1 schematically shows a first embodiment of the present invention.
FIG. 2 schematically shows a simplified embodiment which eliminates some elements from the embodiment shown in FIG. 1.

In FIG. 1, S designates a light source and L1 denotes condenser lens for condensing the light from the source S and forming it into a parallel beam. Behind the condenser lens L1, there is disposed a monochrome filter F for converting the light passed through the condenser lens L1 into a predetermined wavelength of light. M1 is a half-mirror. A polarizer P is disposed with its azimuth maintained at 90° with respect to the incidence surface of the half-mirror M1. The azimuth of the polarizer provides the reference azimuth for other elements which will hereinafter be described. X1 is a light modulator such as K.D.P. or the like whose principal axial azimuth is maintained at 45° with respect to said reference azimuth.

An alternating voltage of certain frequency is applied to the modulator by an oscillator KD1 to impart a phase difference modulation of certain frequency to the linearly polarized light passing through the modulator.

Q1 denotes a ¼ wavelength plate whose axial azimuth is maintained at 0° with reference azimuth. X2 is a light modulator such as K.D.P. or the like whose principal axial azimuth is maintained at 45° with respect to said reference azimuth. An alternating voltage of the same frequency as that of the alternating voltage applied to the light modulator X1 but of different phase is applied to the light modulator X2 by an oscillator KD2 to further impart a modulation of certain frequency (azimuth angle modulation) to the light passing through the modulator X2. After all, the K.D.P. light modulator X1, the ¼ wavelength plate Q1 and the K.D.P. light modulator X2 impart a phase difference modulation and an azimuth angle modulation to the linearly polarized light of azimuth angle 0° passed through the polarizer P. Designated by H is a ½ wavelength plate rotatable disposed with the reference azimuth as the reference. Q2 is a ¼ wavelength plate whose axial azimuth is maintained at 45° with respect to the reference azimuth. O denotes a sample object whose azimuth is maintained at 45° with respect to the reference azimuth and which is disposed perpendicularly to the optical axis. M2 is a mirror disposed perpendicularly to the optical axis.

The half-mirror M1 reflects the light reflected by the mirror M2 and directs such light to a condenser lens L2. A photoelectric converter PM is provided to convert the light condensed by L2 into an electrical signal. A synchronous rectifier circuit PS1 is connected to the output side of the photoelectric converter PM to derive, from the output signal of the converter PM, only a phase difference modulation component related to the detection of the phase difference $\Delta$ of the sample modulated by the K.D.P. light modulator X1. A servo-amplifier SA is connected to the output side of the synchronous rectifier circuit PS1 to amplify the signal from the circuit PS1 and supply the amplified signal to a servo-motor M, which is operable in response to such signal to rotate the ½ wavelength plate H. A potentiometer PT is connected to the servo-motor M to detect the amount of revolution of the servo-motor. Display means DS1 is connected to the potentiometer PT to receive the output signal thereof as input signal to display the phase difference $\epsilon$ of the sample. A synchronous rectifier circuit PS2 is connected to the output side of the photoelectric converter PM to derive, from the output signal of the converter PM, only an azimuth angle modulation component related to the detection of the azimuth angle $\phi$ of the sample modulated by the K.D.P. light modulator X2. Display means DS2 is connected to the synchronous rectifier circuit PS2 to receive the output signal thereof as input signal to display the azimuth angle $\phi$ of the sample.

Operation of the above-described first embodiment will now be explained with the aid of a Poincaré sphere shown in FIGS. 3a to 3g. It should be understood that the Poincaré sphere shown there is a view taken from above the north pole thereof.

Figure 3A:
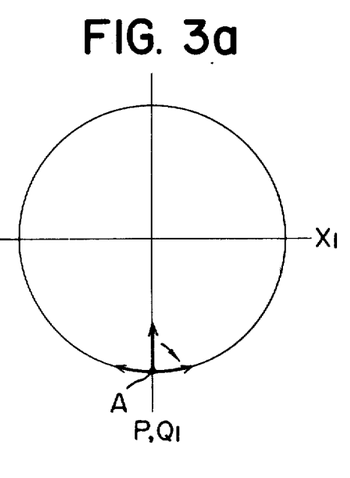
FIGS. 3a to 3g illustrate the operations of the various embodiments of the present invention.

In FIG. 3a, a point A on the equator indicates a linearly polarized light of azimuth angle 0° which results from the light passed from the source S through the condenser lens L1, the monochrome filter F, the half-mirror M1 and the polarizer P. The linearly polarized light passes through the K.D.P. light modulator X1, whereby a phase difference modulation is imparted to the linearly polarized light indicated at point A (see the arrow on the meridian indicated in FIG. 3a).

This phase difference modulation component is related to the detection of the phase difference $\Delta$ of the sample. As the light so modulated passes through the ¼ wavelength plate Q1, oscillation on the meridian about point A is converted into oscillation on the equator about point A. Thus, the phase difference modulation imparted to the linearly polarized light as indicated at the point A has been converted into a azimuth angle modulation. (This means that the light has been moved in the direction of arrow in FIG. 3a.)

In the following description, it should be understood that the single-headed arrows shown in FIGS. 3a to 3g represent the phase difference modulation component related to the detection of the phase difference $\Delta$ of the sample and the double-headed arrows represent the azimuth angle modulation component related to the detection of the azimuth angle $\phi$ of the sample.

Figure 3B:
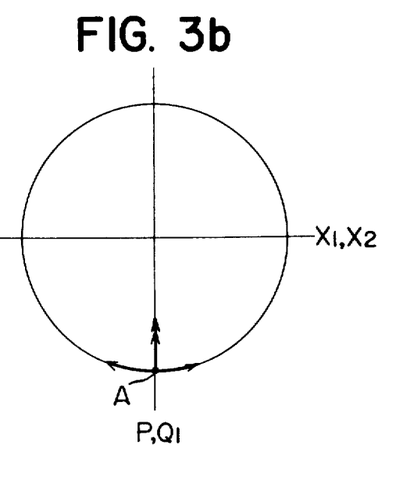

The light passed through the ¼ wavelength plate Q1 further passes through the K.D.P. modulator X2, whereby the phase difference modulation component (the component as indicated by double-headed arrow in FIG. 3b) has been superposed upon the phase difference modulation component converted into the azimuth angle modulation (the component as indicated by single-headed arrow in FIG. 3b). Such phase difference modulation component (the component as indicated by double-headed arrow in FIG. 3b) is related to the detection of the azimuth angle of the sample, as has previously been mentioned. Thus, after all, the phase difference modulation by the K.D.P. light modulator X1 and the azimuth angle modulation by the K.D.P. light modulator X2 have been imparted to the linearly polarized light indicated at point A (see FIG. 3b).

Figure 3C:
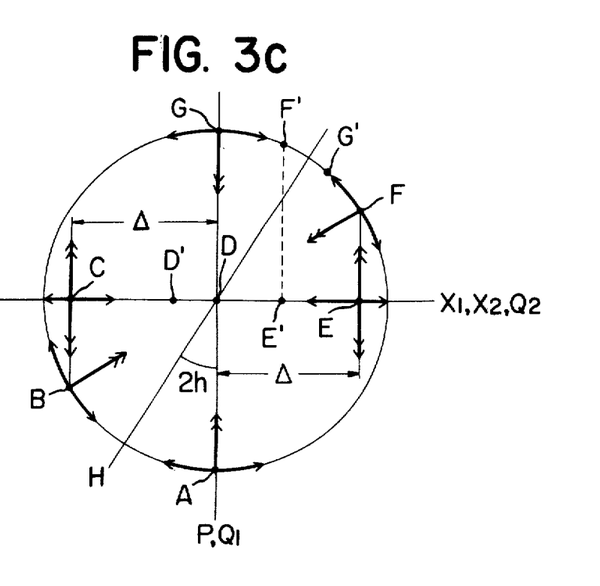
Figures 3D, 3E, 3F:
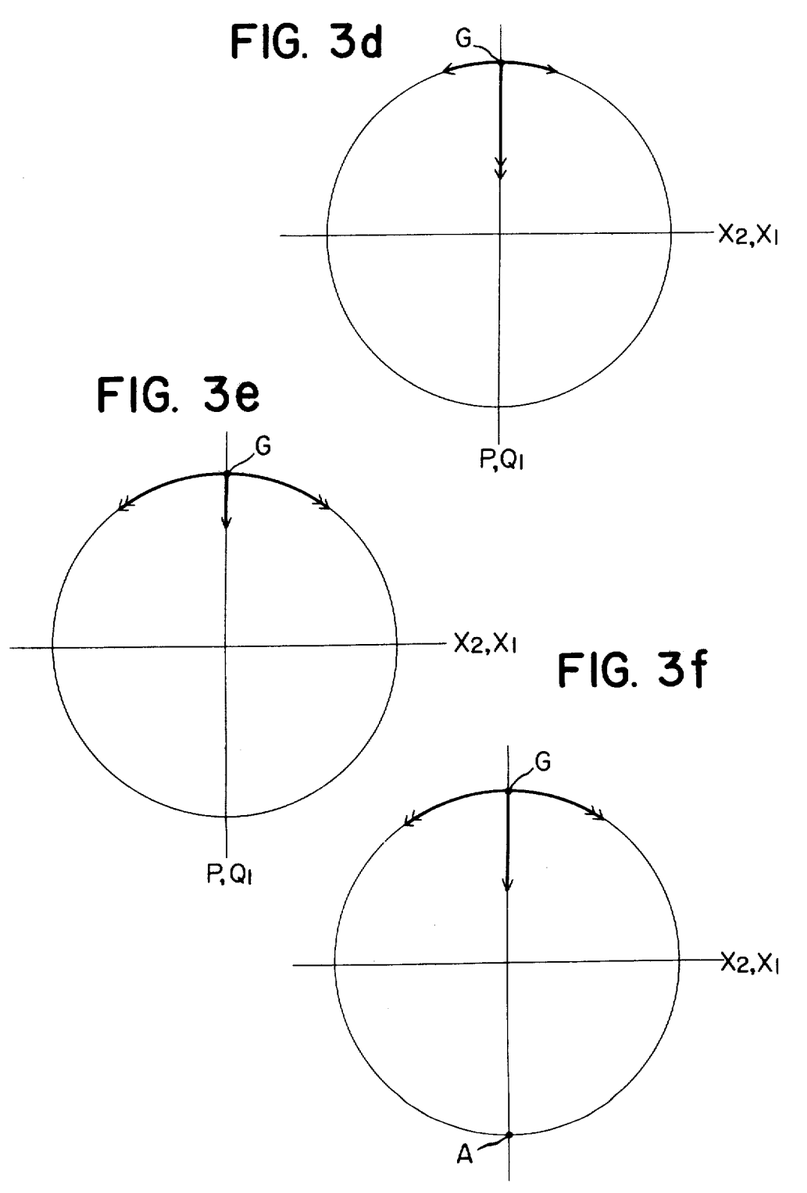

As the light passed through the K.D.P. light modulator X2 passes through the ½ wavelength plate H, it is converted into a linearly polarized light having its azimuth symmetrical about the point A with respect to the azimuth of the ½ wavelength plate H (see the linearly polarized light indicated at point B in FIG. 3c). The linearly polarized light thus modulated at point B enters the ¼ wavelength plate Q2 so that it is converted into an elliptically polarized light indicated at point C. The elliptically polarized light indicated at point C enters the sample O perpendicularly thereto, but if the sample has no linear dichroism, namely, if the amplitude-transmitted factor ratio tan $\phi = tx/ty$ is unity (where $tx$ is the transmittivity in x-axis direction and $ty$ is the transmittivity in y-axis direction), then the elliptically polarized light indicated at point C will be affected as to the phase difference $\Delta$ of the sample but in no way affected as to the azimuth angle of the sample because the light enters the sample O perpendicularly thereto. Thus, the elliptically polarized light at point C, by its passing through the sample O, is displaced to the pole D of the Poincaré, sphere by an amount corresponding to the phase difference $\Delta$, as is shown by FIG. 3c. The circularly polarized light indicated at point D is reflected by the mirror M2 and, when it again enters the sample O, it is further displaced from point D to point E by an amount corresponding to the phase difference $\Delta$. The elliptically polarized light at point E, by its passing again through the ¼ wavelength plate Q2, is displaced from point E to point F which indicates a linearly polarized light, and by its passing again through the ½ wavelength plate H, it is displaced from point F to point G which indicates a linearly polarized light (see FIG. 3c). As the linearly polarized light at point G enters the K.D.P. light modulator X2, a further phase difference modulation is imparted to the phase difference modulation component at point G to double the phase difference modulation component (see FIG. 3d). As the light shown in FIG. 3d passes again through the ¼ wavelength plate Q1, the light is converted into the condition as indicated in FIG. 3e (that is, the azimuth modulation component and the phase difference modulation component have been converted into each other). After all, this means that in the forward course the light passed through the K.D.P. light modulator X1 passes through the ¼ wavelength plate Q1, whereby the phase difference modulation component of such light converted into an azimuth modulation component (FIG. 3a), and in the backward course the light passed through the K.D.P. light modulator X2 passes again through the ¼ wavelength plate Q1, whereby the light restores its original condition. Further, the light passed through the ¼ wavelength plate Q1, as shown in FIG. 3e, passes through the K.D.P. light modulator X1, whereby a further phase difference modulation is imparted to the phase difference modulation component to double the phase difference modulation component.

Figure 3G:
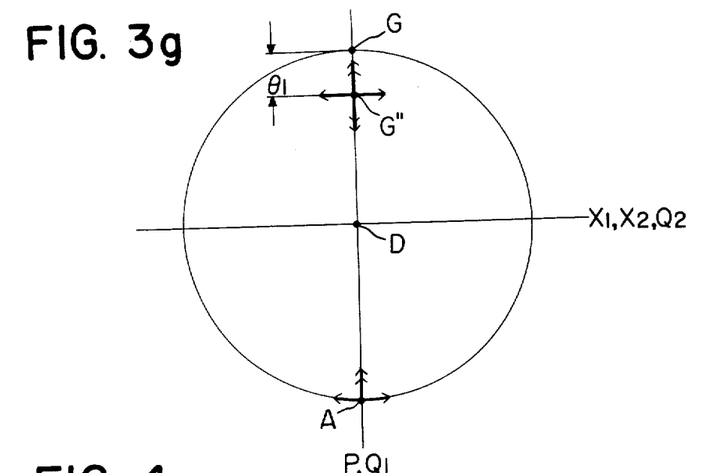

The linearly polarized light thus modulated, as shown in FIG. 3g, enters the polarizer P again, whereby it is extinguished to nullify the electrical signal from the photoelectric converter PM, so that the servo-motor M is deenergized and the ½ wavelength plate H is stopped there. In other words, when the ½ wavelength plate H has been stopped after rotated by an angle $h$ from the azimuth angle 0°, the phase difference $\Delta$ of the sample is given by $\Delta = 4h$ and the value of such $\Delta$ is displayed by the display means DS1. Also, as previously described, if the sample O has no linear dichroism, the display means DS2 will display that the angle $\phi$ representing the later-described amplitude-transmitted factor ratio is always 45°.

Figure 4:
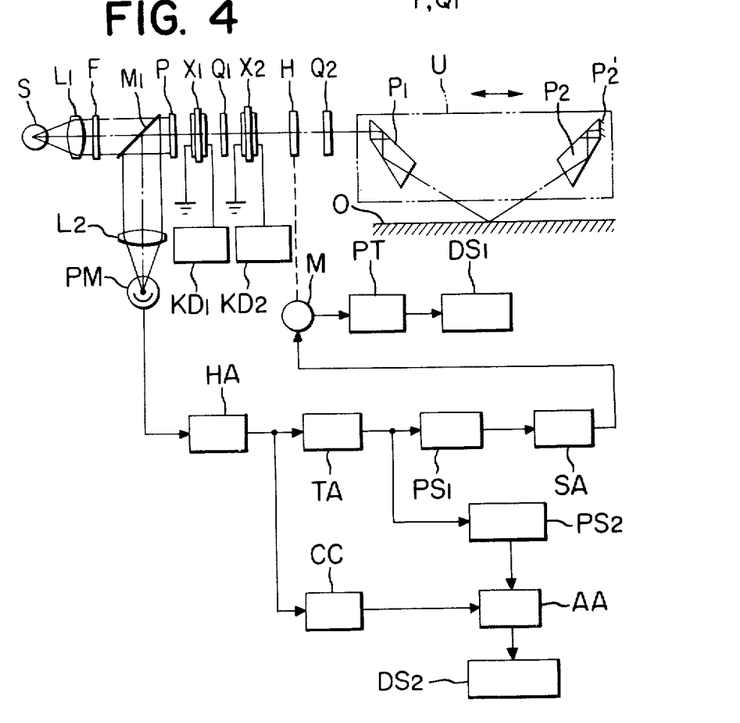
FIG. 4 schematically shows a second embodiment of the present invention.

FIG. 4 shows a second embodiment of the present invention which enables measurement to be effected with high accuracy and over a wide range by taking into account such factors as irregularity of radiation of the light source, the internal reflections in the optical system, etc.

In FIG. 4, reference numerals similar to those shown in FIG. 1 designate elements similar to those in FIG. 1. Designated by P1 is a total reflection prism designed such that a single total reflection causes the phase to shift over 45° and that internal reflection occurs twice. P2 is a similar total reflection prism disposed symmetrically with the total reflection prism P1 with respect to the surface of incidence of the sample O. The surface of emergence P2' of the total reflection prism P2 is formed as a mirror surface. This mirror surface P2' is for reflecting the light reflected by the sample O and therefore, if a separate mirror is provided behind the surface of emergence of the total reflection prism P2, the mirror surface P2' need not be formed on the prism P2. The total reflection prisms P1 and P2 and the mirror surface P2' are formed in a predetermined manner and together constitute a measuring portion U movable in the direction of arrow. HA is a first stage amplifier for amplifying the signal from a photoelectric converter PM. TA designates a tuning amplifier for deriving only the same frequency of signal as the modulation frequency component by the K.D.P. light modulators X1 and X2 for cutting any electrical signal attributable to the internal reflection in the optical system. AA is an operation circuit.

The polarized light at point C in FIG. 3c, by its passing through the sample (i.e. by the reflection occurring twice), is affected by azimuth angle $\phi$ as well as phase difference $\Delta$, of the sample, and in the first embodiment, therefore, the condition of the polarized light after having passed through the ½ wavelength plate H in the backward course has been indicated at point G, whereas in the present embodiment such condition is indicated at point G'' displaced by Q1 from point G, as shown in FIG. 3g. Again in this instance, the amplitude-reflection factor ratio of the sample is represented by $$\tan \phi = \frac{r_p}{r_s}$$

where $r_p$ is the reflection factor of horizontal component to the incidence surface of the sample O and $r_s$ is the reflection factor of vertical component to the incidence surface of the sample O. Thus, the azimuth angle, one of the two polarization variables, may be given by $$\phi = \tan^{-1}\left(\tan \frac{90°-\theta_1}{2}\right).$$

That is, the azimuth angle $\phi$ may be determined by knowing $\theta_1$. An electrical signal for the azimuth angle modulation component reflected to the detection of the azimuth angle $\phi$ of the sample is obtained by a synchronous rectifier circuit $PS_2$, and such azimuth representing electrical signal U is represented by, $$U = \frac{V_0}{2}(\sin 2\theta_0 \sin 2\theta_1)$$

$$\frac{2U}{V_0 \sin 2\theta_0} = \sin 2\theta_1.$$

Thus, $\theta_1$ may be expressed as:

$$\theta_1 = \frac{1}{2} \sin^{-1} \frac{2U}{V_0 \sin 2\theta_0}$$

where $V_0$ is a maximum voltage for the angle of rotation of the ½ wavelength plate $H$, and $\theta_0$ is a phase difference proportional to the alternating voltage applied to the K.D.P. light modulator X2. The operation circuit AA calculates $\theta_1$ from the azimuth representing electrical signal U from the synchronous rectifier circuit.

A correction circuit CC is provided. The output signal of the photoelectric converter PM is variable with irregularity of the radiation of the light source S, thus resulting in creation of measurement error. For this reason, the correction circuit CC is used to correct such variation by applying a signal to the operation circuit AA in accordance with the variation.

Display means DS2 is provided to receive, as input, the signal for $\theta_1$ from the operation circuit AA to calculate $$\tan^{-1}\left(\sqrt{\tan \frac{90°-\theta_1}{2}}\right)$$

and display the value of the azimuth angle $\phi$.

In the present embodiment, the phase difference $\Delta$ of the sample is represented by
$\Delta = 4h + (360° - 2\Delta_0)$,
where 2$\Delta_0$ is the phase shift after the light has reciprocated between the total reflection prisms P1 and P2. In the present embodiment, 2$\Delta_0$=360° and thus, no phase variation will occur even if the light has passed through these prisms P1 and P2. Therefore, as in the first embodiment, the value of the phase difference $\Delta$ is indicated by display means $DS_1$, on the basis of the signal from potentiometer PT for the angle of rotation $h$ of the ¼ wavelength plate H from its azimuth angle 0°.

In the present embodiment, it is also possible to measure the sample over a wide range by moving only the measuring portion U in the direction of arrow.

Figure 5:
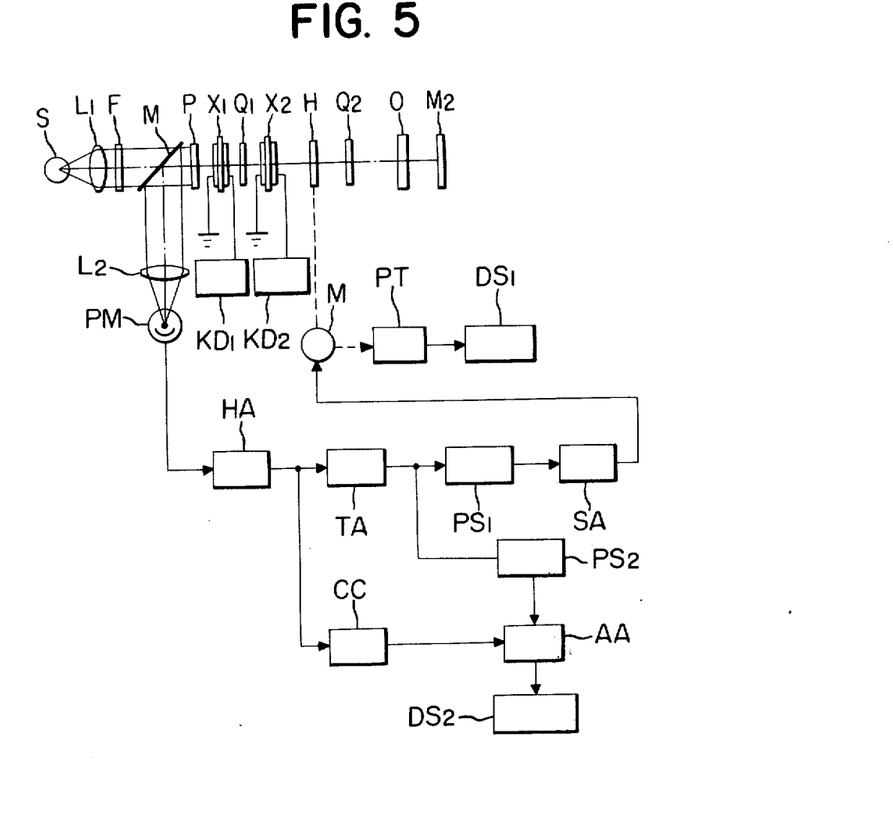
FIG. 5 schematically shows a third embodiment of the present invention.

FIG. 5 illustrates a third embodiment of the present invention. When a sample of linear dichroism is used as the sample O in the polarization analyser device according to the first embodiment as shown in FIG. 1, the third embodiment enables the azimuth angle $\phi$ to be obtained for the phase difference and the amplitude-transmitted factor ratio of the sample (tan $\phi$= ty/ty, where tx is the transmittivity of the sample in x-axis direction and ty is the transmittivity in y-axis direction). More specifically, in the present embodiment, as in the second embodiment shown in FIG. 4, the condition of the polarized light after having passed through the ¼ wavelength plate H in the backward course is indicated at point G'' displaced by Q1 from point G, as shown in FIG. 3g, in accordance with the difference between the transmittivity tx of the sample in x-axis direction and the transmittivity ty in y-axis direction.

By knowing $\theta_1$, the angle $\phi$ may be known from the equation $$\phi = \tan^{-1}\left(\sqrt{\tan \frac{90°-\theta_1}{2}}\right)$$

and the value of $\phi$ is indicated by display means DS2. The electrical system in the third embodiment is entirely identical with that in the second embodiment.

In the first embodiment of the present invention shown in FIG. 1, if the sample O is of no linear dichroism, the value of the angle $\phi$ representing the amplitude-transmitted factor ratio will always be indicated as 45° by the display means DS2, as previously described. Therefore, when a sample of no linear dichroism is used, the K.D.P. light modulator X2 for imparting azimuth angle modulation, the oscillator KD2, the synchronous rectifier circuit PS2 and the display means DS2 may safely be eliminated from the embodiment of FIG. 1, as is shown in FIG. 2.

I claim:
1. A reciprocally movable polarization analyser device comprising a light source (S), a condenser lens

(L1) for froming the light from said source into a parallel light beam, a monochrome filter (F) for forming the light from said lens into a predetermined wavelength of light, a polarizer (P) for froming the light from said filter into linearly polarized light, a light modulator (X1) disposed with its principal axial azimuth maintained at 45° with respect to the axial azimuth of said polarizer (reference azimuth), an oscillator (KD1) for applying a predetermined frequency of alternating current to said light modulator to thereby impart, in cooperation with said modulator, a phase difference modulation to the light as it passed therethrough, a first ¼ wavelength plate (Q1) disposed subsequently to said light modulator with its axial azimuth maintained at said reference azimuth, a ¼ wavelength plate (H) disposed subsequently to said first ¼ wavelength plate and for rotation about the optical axis, a second ¼ wavelength plate (Q2) disposed subsequently to said ½ wavelength plate with its axial azimuth maintained at 45° with respect to said reference azimuth, a sample object (O) to be measured disposed perpendicularly to the optical axis with its azimuth maintained at 45° with respect to said reference azimuth, a mirror (M2) for reflecting the light once passed through said sample (O) to cause said light to travel back along the same optical path, a half-mirror (M1) disposed between said monochrome filter and said polarizer for reflecting the light reflected by said mirror (M2) and passed through said polarizer (P), photoelectric converter means (PM) for receiving the light from said half-mirror and converting the same into an electrical signal, a servo-motor (M) for rotating said ½ wavelength plate (H), tuning means (PS1, SA) for deriving, from said electrical signal from said photoelectric converter means, a signal of the same frequency as the frequency component of the phase difference modulation by said light modulator and applying said signal to said servomotor, and phase difference display means (PT, DS1) for detecting the amount of revolution of said servomotor and displaying the value of the phase difference (Δ) of said sample from said amount of revolution.

2. A polarization analyser device according to claim 1 further comprising a second light modulator (X2) disposed between said first ¼ wavelength plate and said ½ wavelength plate and with its principal axial azimuth maintained at 45° with respect to said reference azimuth, a second oscillator (KD2) for applying to said second light modulator an alternating voltage of the same frequency as but of different phase from the alternating voltage applied by said first-named oscillator (KD1) to thereby impart, in cooperation with said second light modulator, an azimuth angle modulation to the light from said first ¼ wavelength plate, second tuning means (PS2) for detecting, from the electrical signal from said photoelectric converter means, only a signal of the same frequency and same phase as the frequency component of the azimuth angle modulation by said second light modulator (X2), and azimuth angle display means (AA,DS2) for calculating the azimuth angle of said sample from the signal from said tuning means and displaying the value thereof.

3. A polarization analyser device according to claim 1, further comprising a correction circuit (CC) for receiving as input the output signal from said photoelectric converter means and supplying said azimuth angle display means with a signal for correcting any variation caused to said output signal by irregular radiation of said light source, and a tuning amplifier (TA) for deriving, from the electrical signal from said photoelectric converter, only a signal of the same frequency component as the frequency modulated by said first (X1) and said second light modulator (X2) and supplying said signal to said first and second tuning means.

4. A reciprocally movable polarization analyser device comprising a light source (S), a condenser lens (L1) for forming the light from said source into a parallel light beam, a monochrome filter (F) for forming the light from said lens into a predetermined wavelength of light, a polarizer (P) for forming the light from said filter into linearly polarized light, a first light modulator (X1) disposed with its principal axial azimuth maintained at 45° with respect to the axial azimuth of said polarizer (reference azimuth) a first oscillator (KD1) for applying a predetermined frequency of alternating current to said light modulator to thereby impart, in cooperation with said light modulator, a phase difference modulation to the light as it passes therethrough, a first ¼ wavelength plate (Q1) disposed subsequently to said first light modulator with its axial azimuth maintained at said reference azimuth, a second light modulator (X2) disposed with its principal axial azimuth maintained at 45° with respect to said reference azimuth, a second oscillator (KD2) for applying to said second light modulator an alternating voltage of the same frequency as but of different phase from the alternating voltage applied by said first oscillator (KD1) to thereby impart, in cooperation with said second light modulator, an azimuth angle modulation to the light from said first ¼ wavelength plate, a ½ wavelength plate (H) disposed subsequently to said second light modulator and for rotation about the optical axis, a second ¼ wavelength plate (Q2) disposed subsequently to said ½ wavelength plate with its axial azimuth maintained at 45° with respect to said reference azimuth, a sample object (O) to be measured, an optical path changing optical system (P1,P2,P2') designed to cause the light from said ¼ wavelength plate (Q2) to impinge on the surface of said sample obliquely thereto and be reflected at a point thereon so that the reflected light travels back along the same optical path to said point of reflection, and the light is again reflected on said point to enter said ¼ wavelength plate and travels back along the same optical path, the surface of incidence of said sample (O) being in coincidence with said reference azimuth, said optical system being movable in parallel to the surface of said sample and in the plane of incidence thereof, a half-mirror (M1) disposed between said monochrome filter and said polarizer for reflecting the light passed back through said optical path changing system and further passed through said polarizer (P), photoelectric converter means (PM) for receiving the light from said half-mirror and converting the same into an electrical signal, a servo-motor (M) for rotating said ½ wavelength plate (H), first tuning means (PS1,SA) for deriving, from said electrical signal from said photoelectric converter means, a signal of the same frequency as the frequency component of the phase difference modulation by said first light modulator and applying said signal to said servo-motor, phase difference display means (PT,DS1) for detecting the amount of revolution of said servo-motor and displaying the value of the phase difference (Δ) of said sample from said amount of revolution, second tuning means (PS2) for detecting, from the electrical signal from said photoelectric converter means, only a signal of the same frequency and same phase as the frequency component of the azimuth angle modulation by said second light modulator (X2), and azimuth angle display means (AA,DS2) for calculating the azimuth angle of said sample from the signal from said second tuning means and displaying the value thereof.

5. A polarization analyser device according to claim 4, further comprising a correction circuit (CC) for receiving as input the output signal from said photoelectric converter means and supplying said azimuth angle display means with a signal for correcting any variation caused to said output signal by irregular radiation of said light source, and tuning amplifier (TA) for deriving, from the electrical signal from said photoelectric converter, only a signal of the same frequency component as the frequency modulated by said first (X1) and said second light modulator (X2) and supplying said signal to said first and second tuning means.

6. A polarization analyser device according to claim 4, wherein said optical path changing optical system comprises a first total reflection prism (P1) for twice reflecting therein the light from said second ¼ wavelength plate to cause the light to impinge on the surface of said sample obliquely thereto, a second total reflection prism (P2) for twice reflecting therein the reflected light from the surface of said sample, and means (P2') for reflecting the light passed through said second total reflection prism to cause the reflected light to travel back along the same optical path, said first and second total reflection prisms (P1,P2) and said reflecting means (P2') being movable as a unit in parallel to the surface of said sample.

7. A polarization analyser device according to claim 6, wherein the phase shift with which the light passes twice through said first and second total reflection prisms is $2\pi$.

* * * * *